| 
US008812358B2

(12) United States Patent
Tirpak et al.

(10) Patent No.: US 8,812,358 B2
(45) Date of Patent: Aug. 19, 2014

(54) METHOD OF PROVIDING A SHARED VIRTUAL LOUNGE EXPERIENCE

(75) Inventors: Thomas M. Tirpak, Glenview, IL (US); Haris Ramic, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 941 days.

(21) Appl. No.: 12/407,221

(22) Filed: Mar. 19, 2009

(65) Prior Publication Data

US 2010/0241512 A1 Sep. 23, 2010

(51) Int. Cl.
*G06Q 30/00* (2012.01)
*G06Q 30/06* (2012.01)
*H04L 12/18* (2006.01)
*A63F 13/12* (2006.01)
*G06Q 30/02* (2012.01)

(52) U.S. Cl.
CPC ........... *A63F 13/12* (2013.01); *A63F 2300/572* (2013.01); *G06Q 30/0601* (2013.01); *A63F 2300/5506* (2013.01); *A63F 2300/5566* (2013.01); *H04L 12/1822* (2013.01); *G06Q 30/0251* (2013.01)
USPC ......................................................... 705/14.4

(58) Field of Classification Search
None
See application file for complete search history.

(56) References Cited

U.S. PATENT DOCUMENTS

| 6,931,254 B1* | 8/2005 | Egner et al. ................. 455/456.3 |
| 2003/0018716 A1* | 1/2003 | Webb et al. ................... 709/205 |
| 2005/0021472 A1* | 1/2005 | Gettman et al. ................. 705/52 |
| 2005/0033656 A1* | 2/2005 | Wang et al. ....................... 705/26 |
| 2007/0244968 A1 | 10/2007 | Andreasson |
| 2008/0263459 A1* | 10/2008 | Altberg et al. ................. 715/757 |
| 2009/0125819 A1* | 5/2009 | Hamilton et al. ............. 715/757 |
| 2009/0319397 A1* | 12/2009 | Joe et al. ......................... 705/27 |
| 2009/0319609 A1* | 12/2009 | Ferraro ......................... 709/204 |
| 2010/0005141 A1* | 1/2010 | Cannon et al. ................ 709/204 |

FOREIGN PATENT DOCUMENTS

| EP | 1 209 849 A2 | 5/2002 |
| EP | 1 976 207 A1 | 10/2008 |
| EP | 2 015 530 A1 | 1/2009 |
| WO | WO 02/101483 A2 | 12/2002 |
| WO | 2005015880 A1 | 2/2005 |

OTHER PUBLICATIONS

Buscher, M. et al.: "Collaborative Augmented Reality Environments: Integrating VR, Working Materials, and Distributed Work Spaces", In Proceedings of the Third International Conference on Collaborative Virtual Environments (San Francisco, California, United States), P. 2000, E. Churchill and M. Reddy, Eds., CVE'00, ACM, New York, NY, pp. 47-56.

Ben Ford, S. et al.: "Understanding and Constructing Shared Spaces with Mixed-Reality Boundaries", ACM Trans. Comput-Hum. Interact. 5, 3 (Sep. 1998), pp. 185-223.

(Continued)

*Primary Examiner* — Matthew T Sittner
(74) *Attorney, Agent, or Firm* — Shumaker & Sieffert, P.A.

(57) ABSTRACT

A method (400, 500, 600, 700, 800, 900) of providing a shared virtual lounge experience. The method can include analyzing one or more messages communicated from a first participant (104) in a virtual world (102) to a second participant (106) in the virtual world to determine at least one context (110) of the message(s). Based on the determined context of the message(s), a context-specific virtual lounge (112) can be dynamically created to pertain to the determined context and host participant interactions.

20 Claims, 6 Drawing Sheets

(56) References Cited

OTHER PUBLICATIONS

Sugimoto, M. et al.: "ePro: A System for Supporting Collaboration That Enhances Interactions", Tokyo Univ. Japan; Systems, Man and Cybernetics, 2000 IEEE International Conference on, Oct. 8-11, 2000, vol. 2, Digital Object Identifier: 10.1109/ICSMC.2000. 885938, pp. 745-750.

Zhai, Zhengiun et al.: "An adaptive grouping scheme in collaborative virtual environment systems", Compt. Coll. Northwestern Polytech. Univ. Xi'an, China, Cyberworlds, 2005, International Conference on, Nov. 23-25, 2005, Digital Object Identifier: 10.1109/CW.2005.14, 5 pages.

Van Dyke, et al., "Butterfly: A Conversation-Finding Agent for Internet Relay Chat," Association of Computing Machinery (ACM), Proceedings of the 4th International Conference on Intelligent User Interfaces (IUI 1999), Los Angeles, CA, USA, Jan. 5, 1999, pp. 39-41.

Jan Fischer, "Corresponding Application PCT/US2010/027111—PCT International Search Report and Written Opinion," WIPO, ISA/EP, European Patent Office, Rijswijk, Netherlands, Jul. 16, 2010, 15 pages, most relevant pp. 5-7 and 11-13.

* cited by examiner

402 Analyze one or more messages communicated among at least a first participant in a virtual world and a second participant in the virtual world to determine a context of the message(s)

↓

404 Based on the determined context of the message(s), dynamically create the virtual lounge to pertain to the determined context and host participant interactions

↓

406 Provide within the virtual lounge one or more links to emergency response services, the links being selectable by participants of the virtual lounge to contact the emergency response services from within the virtual lounge

↓

408 Automatically invite the first participant in the virtual world and/or the second participant in the virtual world to participate in the virtual lounge

↓

410 Based on the determined context to which the virtual lounge pertains, automatically communicate an invitation to one or more other participants in the virtual world, the invitation inviting the participant(s) in the virtual world to participate in the virtual lounge

↓

412 Receive data representing real-world information and dynamically adapt the virtual lounge to reflect the received data

↓

414 Monitor present circumstances of the virtual lounge

↓

416 Update the determined context to which the virtual lounge pertains to correspond to present circumstances

↓

418 Monitor messages exchanged in other virtual lounges and/or the virtual world

↓

420 Do one or more other messages exchanged in another virtual lounge relate to the determined context of the virtual lounge?

No → (loop back)

Yes ↓

422 Automatically merge the other virtual lounge with the present virtual lounge

Receive from a participant in the virtual lounge a request to invite at least a third participant in the virtual world into the virtual lounge
502

↓

Communicate to the other participant in the virtual world an invitation corresponding to the request
504

Identify one or more services that are likely to be of interest to at least one participant in the virtual lounge based on the determined context
602

↓

Interface with at least one service provider that provides one or more services that are likely to be of interest to at least one participant in the virtual lounge in order to facilitate a purchase transaction
604

↓

Automate presentation to the participant(s) of at least one listing of the identified services
606

Identify at least one advertisement that is related to the determined context to which the virtual lounge pertains
702

↓

Automate presenting the advertisement to at least one participant in the virtual lounge
704

METHOD OF PROVIDING A SHARED VIRTUAL LOUNGE EXPERIENCE

BACKGROUND OF THE INVENTION

1. Field of the Invention

The present invention generally relates to virtual worlds and, more particularly, to virtual lounges.

2. Background of the Invention

Over the last decade the popularity of massive multiplayer online games (MMOGs), for example World of Warcraft® and Second Life®, has grown significantly. With MMOGs, a very large number of game players who communicate via a network, such as the Internet, can game with one another in a commonly shared virtual gaming environment, also known as a "virtual world."

Virtual worlds oftentimes include, or link to, one or more virtual lounges. In a virtual lounge, avatars for respective participants are presented, and participants can communicate with one another. For example, a first participant can select avatars for other participants and send text messages to those participants. Alternatively, the first participant can choose to send a text message to all of the participants. In some virtual lounges, voice communications also are supported. Thus, participants within the virtual lounges are able to converse with one another using voice over internet protocol (VoIP) communications.

SUMMARY OF THE INVENTION

The present invention relates to a method of providing a shared virtual lounge experience. The method can include analyzing one or more messages communicated from a first participant in a virtual world to a second participant in the virtual world to determine at least one context of the first message. Based on the determined context of the message(s), the context-specific virtual lounge can be dynamically created. The context-specific virtual lounge can pertain to the determined context and host participant interactions. Further, the first participant in the virtual world and/or the second participant of the virtual world can be automatically invited to participate in the context-specific virtual lounge.

Yet another embodiment of the present invention can include a computer program product including a computer-usable medium having computer-usable program code that, when executed, causes a machine to perform the various steps and/or functions described herein.

BRIEF DESCRIPTION OF THE DRAWINGS

Preferred embodiments of the present invention will be described below in more detail, with reference to the accompanying drawings, in which:

FIG. 4 is a flowchart that is useful for understanding the present invention.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to providing a shared virtual lounge experience. More specifically, messages communicated between participants in a virtual world can be analyzed to determine the context of the messages. Based on the determined context, a context-specific virtual lounge can be dynamically created. The context-specific virtual lounge can pertain to the determined context of the messages and host participant interactions. Moreover, participants in the virtual world, as well as other users, can be invited to participate in the context-specific virtual lounge, either automatically or at the request of other participants. Accordingly, virtual world participants and other users who have common interests can be dynamically provided a virtual environment in which to interact that is distinct from the virtual world.

Figure 1:
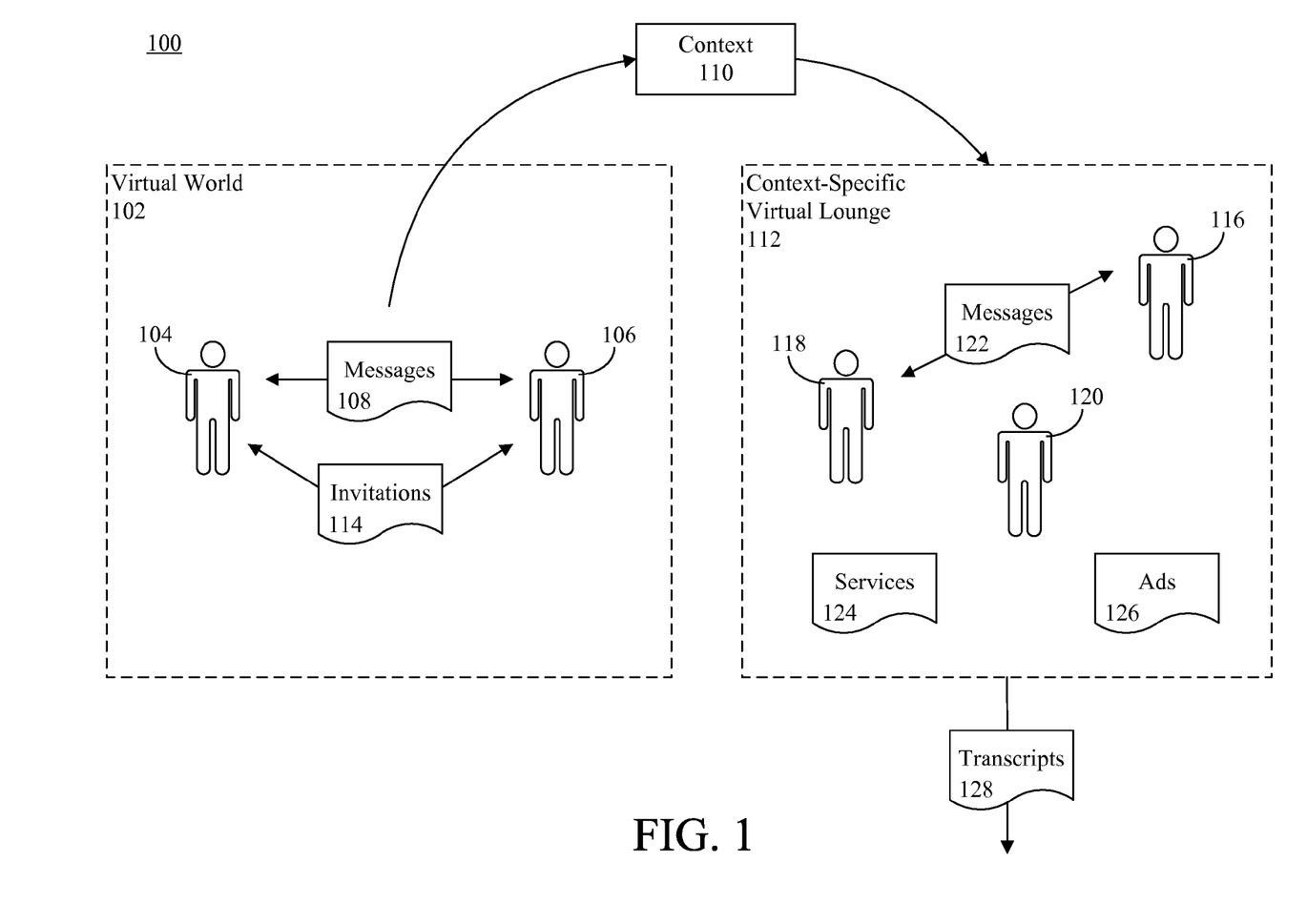
FIG. 1 depicts a virtual environment that is useful for understanding the present invention.

FIG. 1 depicts a virtual environment 100 that is useful for understanding the present invention. The virtual environment can include a virtual world 102. As used herein, a "virtual world" is a computer-simulated environment intended for its participants to inhabit and interact via avatars or other software agents acting on behalf of the participants. An example of a virtual world is an environment presented in a massive multiplayer online game (MMOG), such as World of Warcraft® or Second Life®. As used herein, an "avatar" is a representation of a participant in the form of a three-dimensional model, a two-dimensional icon, a text construct, a sound and/or a haptic interface action. Notably, a participant need not be a human. For example, a participant can be an instance of an application configured to participate in a virtual world. Moreover, such application can participate in the virtual world based on any of a variety of data, such as data corresponding to actions of other participants or data corresponding to any of a variety of data input devices (e.g., image capture devices, data input devices, weather monitoring devices, and so on).

Within the virtual world 102, participants 104, 106 can exchange messages among one another. One or more of the messages 108 can be analyzed to determine their context 110. Based on the determined context 110, a context-specific virtual lounge 112 can be dynamically created which pertains to the context 110 and hosts participant interactions. As used herein, a "context-specific virtual lounge" is a virtual world environment established based on at least one identified context of at least one communication generated by a participant in a virtual world, and in which selected participants can communicate among one another. Further, within a context-specific virtual lounge, participants of the context-specific virtual lounge are represented by avatars, or other software agents. Hereinafter, a "context-specific virtual lounge" may simply be referred to as a "virtual lounge."

Invitations 114 to the virtual world participants 104, 106 can be automatically generated to invite them to participate in the virtual lounge 112. In addition, invitations 114 also can be automatically generated for other virtual world participants, or generated in response to requests from virtual world participants 104, 106 and/or participants 116, 118, 120 in the virtual lounge 112.

From within the virtual lounge 112, the participants 116-120 can interact and communicate among one another. Messages 122 exchanged among the participants 116-120 also can be analyzed to establish triggers to automatically initiate any of a myriad of actions. For example, a listing of available services 124 and/or advertisements 126 likely to be of interest to the participants 116-120 can be presented in the virtual lounge, as will be described herein.

From within the virtual lounge 112, the participants 116-120 also can initiate any of a number of shared actions including, but not limited to, viewing the listing of available services 124 (e.g., restaurant menus, movie previews, and the like). In addition, available services can be selected and utilized by the participants 116-120 (e.g., to place restaurant reservations, purchase of movie tickets, preview movies, etc.).

In another aspect of the inventive arrangements, transcripts 128 of messages 122 exchanged in the virtual lounge 112, as well as actions performed by avatars within the virtual lounge, can be generated. The transcripts 128 can be shared with other users not present in the virtual lounge 112, or reviewed at a later time by participants 116-120 in the virtual lounge 112. For example, a participant 116 in the virtual lounge 112 can selectively choose to send a transcript 128 of the virtual lounge experience to one or more users who may, or may not, have participated in the virtual lounge 112. Generation of the transcripts 128 will be described herein in greater detail.

Figure 2:
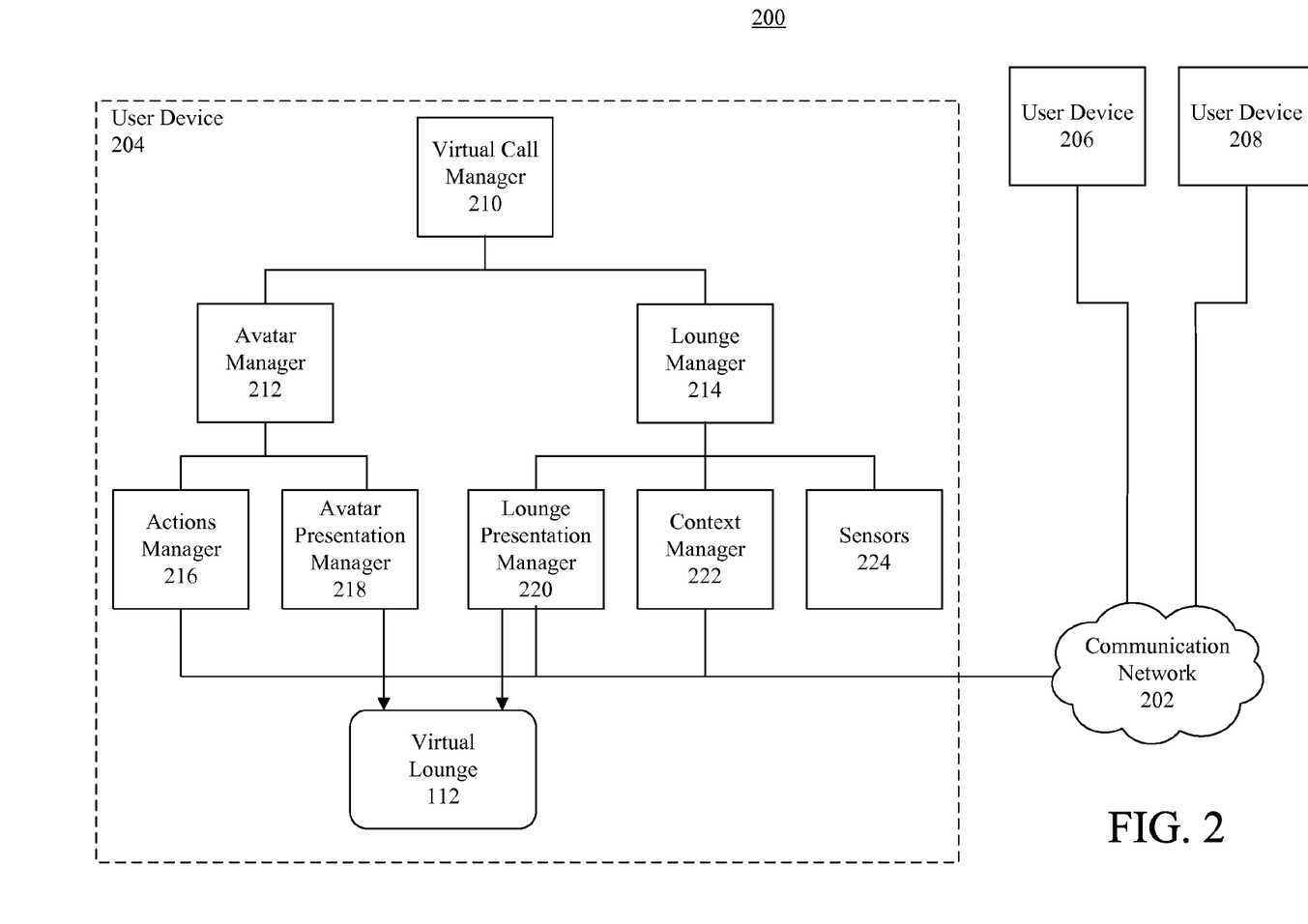
FIG. 2 depicts a client-side block diagram of a communication system that is useful for understanding the present invention.

FIG. 2 depicts a client side block diagram of a communication system (hereinafter "system") 200 that is useful for understanding the present invention. The communication system 200 can include a communication network 202. The communication network 202 can comprise a wide area network (WAN), such as the Internet, the World Wide Web, an interconnect communications network (e.g. a cellular communications network), a public switched telephone network (PSTN), and the like. A suitable communications network also may comprise a local area network (LAN), a metropolitan area network (MAN), a WiFi network, a Mesh network, and/or any other networks or systems over which communication signals can be propagated. In that regard, the communications network can include wired and/or wireless communication links, and the communications network can be implemented in accordance with any suitable communications standards, protocols, and/or architectures, or a suitable combination of such standards, protocols, and/or architectures.

The system also can include a plurality of user devices 204, 206, 208. The user devices 204-208 can be any devices which may be communicatively linked via the communication network 202 and that include a user interface configured to present a virtual lounge 112 to a user. Examples of such user devices 204-208 include, but are not limited to, computers, mobile computers, mobile telephones, mobile radios, personal digital assistants, gaming devices, and any other devices providing a suitable user interface and which are suitably configured to communicate via the communication network 202.

The user device 204 can include a virtual call manager 210. The virtual call manager 210 can place and manage virtual calls for a user (hereinafter "participant") of the user device 204 who is participating in a virtual world, or a software agent that is participating in the virtual world. For example, the virtual call manager 210 can manage virtual calls from the participant to other participants in the virtual world. One example of a virtual call is a call to one or more virtual world participants inviting them to participate in a virtual lounge 112. Such call can include a hyperlink to the virtual lounge 112, access codes that may be required to gain access into the virtual lounge 112, user comments, and so on.

The virtual call manager 210 also can manage messages exchanged between software agents that are instantiated on the user device 204, for example an avatar manager 212 and a lounge manager 214. For instance, the virtual call manager 210 can ensure that avatar actions initiated by the participant are communicated from the avatar manager 212 to the lounge manager 214. The location of the avatar, which can be described in terms of coordinates and/or reference locations in a virtual world, also can be communicated from the avatar manager 212 to the lounge manager 214.

The avatar manager 212 can manage the participant's avatar. By way of example, the avatar manager 212 can manage the participant's avatar via an actions manager 216. The actions manager 216 can trigger actions to be performed by the participant's avatar, for example in response to inputs from the participant or other participants of the virtual lounge 112. In addition, the actions manager 216 can notify other user devices 206, 208 being used by participants in the virtual lounge 112 to update their virtual lounge 112 presentations accordingly.

The avatar manager 212 can interface with an avatar presentation manager 218 to present the participant's avatar (e.g. display the avatar, generate a sound that is the avatar, generate a haptic signal that is a characteristic of the avatar, etc.), including actions performed by the avatar. In illustration, if the participant's avatar moves within the virtual lounge 112, the avatar presentation manager 218 can present such movement in a suitable manner. For example, the avatar presentation manager 218 can present graphical information showing the avatar moving, as well as audio signals corresponding to foot steps.

The avatar presentation manager 218 also can present other types of information corresponding to the avatar. For instance, if the avatar falls, the avatar presentation manager can present a haptic response via a suitable haptic device (e.g., a user input device with vibration and/or force feedback). In another example, if the avatar picks a flower in the virtual lounge 112, the avatar presentation manager can present a scent corresponding to the flower. In this regard, the avatar presentation manager 218 can interface with one or more presentation devices, for example displays, haptic devices, scent generators, and so on. Various device drivers and other applications known in the art can be used to provide suitable interface means.

The lounge manager 214 can manage the virtual lounge 112 for the user device 204. For example, the lounge manager 214 can manage the presentation of the virtual lounge 112 on the user device 204 via a lounge presentation manager. In illustration, the lounge manager 214 can interface with the lounge presentation manager 220 to display the virtual lounge 112 environment and display other avatars, as well as their movements and actions. Audio information (e.g., voice communications, background sounds, etc.), text messages, scents, and haptic responses corresponding to various communications, activities and circumstances within the virtual lounge 112 also can be presented via the lounge presentation manager 220. As such, the lounge presentation manager 220 can interface with one or more presentation devices, for example using suitable interface means.

Although the virtual lounge 112 may be established based on one or more determined contexts, the determined context to which the virtual lounge 112 pertains can be dynamically updated based on present circumstances of the virtual lounge 112. Examples of present circumstances can include, but are not limited to, messages communicated in the virtual lounge 112, activities that take place in the virtual lounge 112, and actions that take place in the virtual lounge 112. For instance, messages, activities, actions and/or other circumstances within the virtual lounge 112 can be analyzed as they occur. In this regard, the determined context to which the virtual lounge 112 pertains may evolve based on user participation, and can be updated in real time. For example, additional contexts can be associated with the virtual lounge 112. Moreover, contexts which no longer represent the present circumstances of the virtual lounge 112 can be disassociated from the virtual lounge 112. Moreover, the manner in which the virtual lounge 112 is presented by the lounge manager 214/lounge presentation manager 220 also may be dynamically configured based on the updates to the virtual lounge 112's context.

In one example, if the context changes or evolves such that it corresponds to the context of a second virtual lounge, the virtual lounge 112 (which, for this example, may be referred to as a "first virtual lounge 112") may be merged with the second virtual lounge. In illustration, the first virtual lounge 112 may be merged into the second virtual lounge, the second virtual lounge may be merged into the first virtual lounge 112, or the first and second virtual lounge may be merged into a third virtual lounge. In other words, a plurality of different virtual lounge sessions that have similar contexts may be merged into a virtual lounge session that includes all of the participants of the original lounge sessions.

To ensure that updates to the context of the virtual lounge 112 are processed and displayed correctly by the lounge presentation manager 220, the lounge manager 214 can interface with the context manager 222, which can track the contexts of the virtual lounge 112. The context manager 222 also can communicate with context managers of other user devices to send and receive context information corresponding to the virtual lounge 112. Further, the context manager 222 can interface with a virtual lounge 112 service manager 330, which will be described in FIG. 3, to retrieve information about available services likely to be of interest to one or more participants of the virtual lounge 112, for instance based on participant/avatar requests within the virtual lounge 112 or the context of messages communicated in the virtual lounge 112, as will be described. Information communicated from the context manager 222 and the actions manager 216 to other user devices 206, 208 and to the virtual lounge services manager 330 can be communicated using simple messaging service (SMS), session initiation protocol (SIP), or any other suitable protocol.

In addition, the virtual call manager 210 can communicate lounge changes from the lounge manager 214 to the avatar manager 212 to ensure that the avatar manager 212 can update the avatar to reflect the lounge changes. For example, if a chair on which an avatar is sitting is removed from the virtual lounge 112, the virtual call manager 210 can communicate a message from the lounge manager 214 to the avatar manager 212 indicating that the chair has been removed. In response, the avatar manager 212 can interface with the actions manager 216 to trigger a corresponding action. For instance, the actions manager 216 can trigger the avatar to perform a fall action, and can communicate corresponding information to other user devices 206, 208.

The lounge manager 214 also can receive data representing cues of a real-world environment from one or more sensors 224. For example the sensors 224 can detect real-world events and/or conditions and generate corresponding data. Examples of such events and/or conditions can include, but are not limited to, voice communications generated by a participant in the virtual lounge 112, other sounds within the real-world environment of the participant, scents detected in the real world environment, and so on. In this regard, the sensors 224 can include image capture devices, motion detectors, scent detectors, input audio transducers, corresponding device processors/controllers, etc. The lounge manager 214 can process the data representing the real-world cues for presentation by the lounge presentation manager 220. Such data also can be shared with other user devices 206, 208 participating in the virtual lounge 112 to update their virtual lounge 112 presentations accordingly.

In one arrangement, the lounge manager 214/lounge presentation manager 220 can superimpose real world images, such as those captured by image capture devices, into the virtual lounge 112. For example, an image capture device can capture an image of a participant (e.g., the participant's face) and superimpose that image onto that participant's avatar. Alternatively, other image files may be selected by participants and superimposed into the virtual lounge 112.

In another arrangement, the lounge manager 214/lounge presentation manager 220 can superimpose the virtual lounge 112 into the real-world, for example using a see-through display. For instance, the see-through display can be placed by a user in a desired location (e.g. in front of a picture, a mirror, a window or a television), and the virtual lounge 112 can be presented on the see-through display in a manner in which a viewer can simultaneously view the virtual lounge 112 and the real-world environment behind the virtual lounge 112. Further, the lounge manager 214 can receive user inputs via suitable user input devices to allow a user to select the level of virtual lounge 112 detail that is presented. For example, a user can select to only display avatars and/or certain details of the virtual lounge 112.

Figure 3:
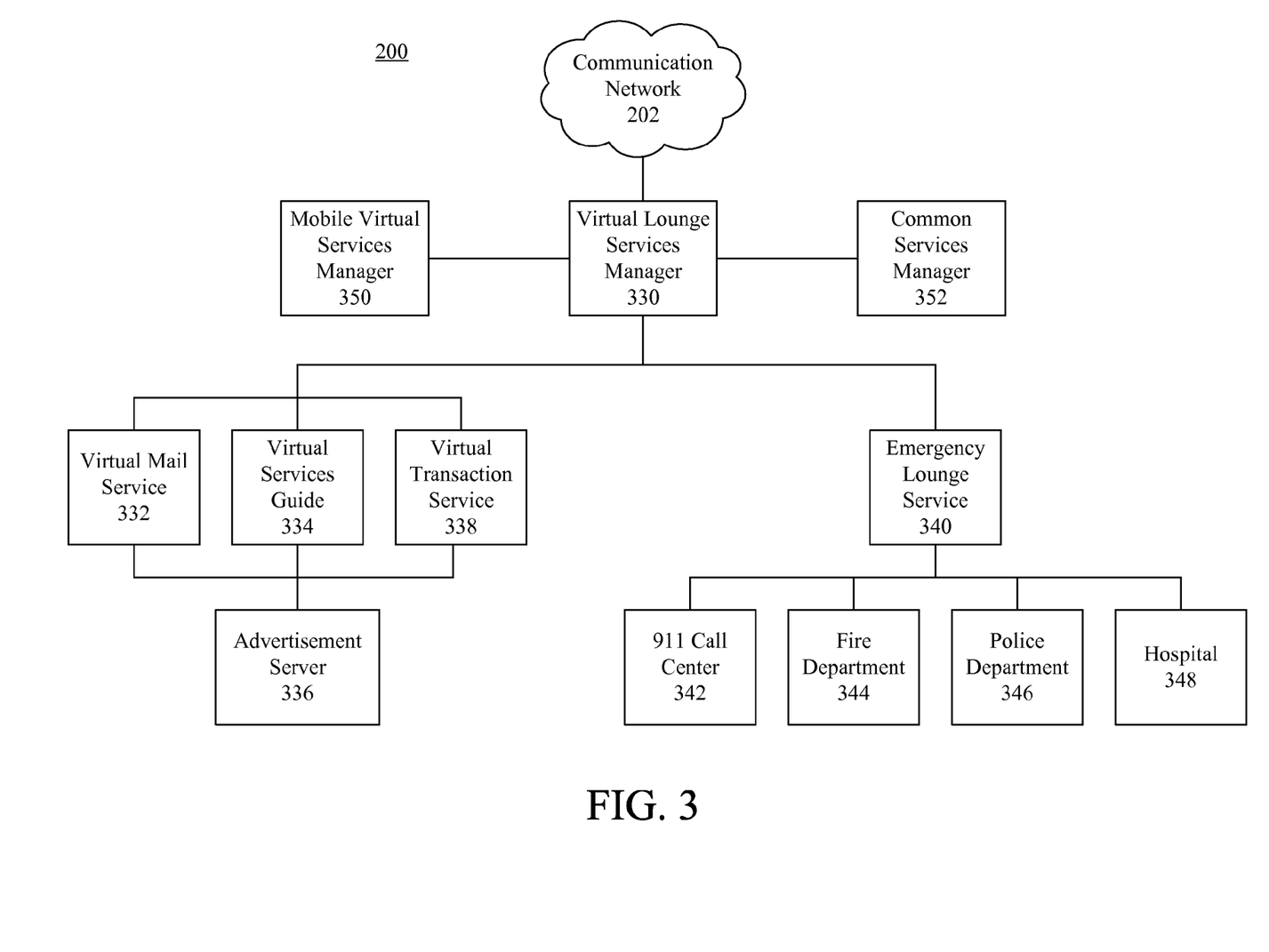
FIG. 3 depicts a server-side block diagram of the communication system of FIG. 2, which is useful for understanding the present invention.

FIG. 3 depicts a server side block diagram of the system 200 of FIG. 2. On the server side, the system can include the virtual lounge services manager 330. The virtual lounge services manager 330 can provide virtual lounge services for the virtual lounge and participants in the virtual lounge. In illustration, the virtual lounge services manager 330 can interface with virtual call managers on various user devices to manage virtual calls established in the virtual lounge. For example, the virtual lounge services manager 330 can receive from the virtual call managers text and voice messages generated by their respective users, and communicate to the virtual call managers text and voice messages being communicated to their respective users.

Further, the virtual lounge services manager 330 can receive from the virtual call managers action information relating to the avatars and participants with which the respective virtual call managers are associated. The virtual lounge services manager 330 also can receive from the respective virtual call managers coordinates of avatars associated with the respective virtual call managers. The virtual lounge services manager 330 can map those coordinates to specific context, for instance context that is visually or audibly presented.

In addition, the virtual lounge services manager 330 can store virtual lounge information, and process virtual lounge mail, for example using a virtual mail service 332. The virtual lounge services manager 330 also can store user profile information for participants in a virtual lounge (e.g., user preferences, etc.), past user selections, past user purchases, and so on. Alternatively, the user profile information, user preferences, past user selections, past user purchases, etc. can be stored by the common services manager 352, and the virtual lounge services manager 330 can retrieve such information from the common services manager when needed.

Via the virtual mail service 332, a participant in a virtual lounge may record a set of actions, such as those performed by one or more avatars in the virtual lounge, as well as record text messages and voice messages generated by participants in the virtual lounge. Using the virtual mail service 332, the participant also can send a transcript of the actions, text messages, voice messages and/or state representations of the virtual lounge to one or more other users. The transcript can be communicated via e-mail, as a file upload, or as a file download. User devices of other user(s) may subsequently process the transcript to replay the actions, text messages and/or voice messages indicated by the transcript to experience the virtual lounge activity that previously occurred when desired.

In one arrangement, the transcript can enable the actions which take place in the virtual lounge to be presented in a video format. For instance, a video can be re-constructed from a transcript that was generated. Moreover, the text messages and/or voice messages can be presented so as to correlate in time with the actions that are presented during the video playback. For example, time stamps can be associated with various actions that are identified by the transcript, as well as text messages and/or voice messages generated by participants in the virtual lounge. The time stamps can be used during the virtual lounge video playback to determine when to present the text messages and/or voice messages. Accordingly, a user who did not participate in the virtual lounge can asynchronously experience the virtual lounge at a later time, or those who did participate in the virtual lounge can re-experience the virtual lounge at a later time.

The virtual mail service 332 also can monitor text messages and/or voice messages and identify the context of such messages. By way of example, the virtual mail service 332 can analyze text messages to identify contextual terms that frequently occur in the text messages. Further, the virtual mail service 332 can implement speech recognition to convert audio messages to text, and can analyze such text to identify frequently occurring contextual terms. As used herein, a "contextual term" is a term that likely will only occur in a limited number of contexts.

For instance, if the term "restaurant" is frequently used within the text messages and/or audio messages communicated in the virtual lounge, the virtual mail service 332 can identify that term as a contextual term and add the term to a list of identified contextual terms (hereinafter "term list"). Words that are not likely to be context-specific, for example, "the," "is," "be," "that," etc., can be considered non-contextual terms and can be ignored when identifying contextual terms.

In one arrangement, non-contextual terms can be contained in one or more suitable data files that are accessible to the virtual mail service 332. As such, the virtual mail service 332 can identify as contextual terms the terms that are contained within text and/or voice messages, but which are not contained in the data file(s). In another arrangement, contextual terms can be contained in one or more suitable data files that are accessible to the virtual mail service 332, and the virtual mail service 332 can identify as contextual terms the terms that are contained within text and/or voice messages, and which are also contained in the data file(s).

The virtual mail service 332 can limit the text and/or audio messages that are analyzed to those messages communicated in a present virtual lounge session. In another arrangement, the virtual mail service 332 can add to the term list a contextual term that is identified in a message, but remove the contextual term from the term list after a certain amount of time has elapsed since the term was identified.

The term list may contain multiple instances of contextual terms that are used repeatedly in the text and/or voice messages. The contextual terms having the highest number of instances contained in the term list can be identified as the context of the messages communicated in the virtual forum. For example, if the contextual term "movie" presently has more instances contained in the term list than any other contextual term, the virtual mail service 332 can identify "movie" as the context of the messages communicated in the virtual lounge.

In one arrangement, more than one context may be identified. In illustration, a threshold value can be established, and any contextual terms contained in the term list and having a number of instances equal to or greater than the threshold value can be identified as context of the messages communicated. By way of example, the threshold value that is established can be determined based upon the number of messages exchanged in the virtual lounge during the current virtual lounge session or the number of messages exchanged within a particular period of time, for instance within the last hour.

When a participant in the virtual lounge wishes to send a transcript of the virtual lounge session to another user, the messages identified by the transcript can be limited to those messages that pertain to the identified context. In this regard, the transcript that is sent can convey to the other user a summary of the virtual lounge session.

For example, if the identified context is "restaurant," text and/or messages containing the contextual term "restaurant" can be identified in the transcript. In addition, other messages that don't contain the contextual term "restaurant", but which likely were communicated as replies to messages that do contain the contextual term, also can be identified in the transcript. Determination of whether a message is a reply to another message containing the contextual term can be based on when the messages are communicated. For instance, if a second message is communicated within a certain period of time following a first message containing a term identified as a contextual term, the second message may be considered a reply to the first message.

Further, messages that contain other terms that are related to the identified contextual term also can be identified as reply messages. In an example, if the first message contains the contextual term "movie" and the second message contains a name of a particular movie, the second message can be considered a reply to the first message. Names of movies, restaurants, products, services, etc. also can be contained in a suitable data file accessible to the virtual mail service 332. In another arrangement, the virtual mail service 332 can access other resources, for instance a virtual services guide 334 and/or an advertisement server 336 to determine whether terms are names of movies, restaurants, products, services, or the like.

In one aspect of the inventive arrangements, the virtual mail service 332 can monitor communications which take place among participants in a virtual world. Further, the virtual mail service 332 can analyze one or more messages communicated among the participants to determine the context of such messages. Alternatively, another service manager (not shown) can be maintained by the host (e.g. a server) of the virtual world, and that service manager can analyze the messages to determine their context.

Determined context can be communicated to the virtual lounge services manager 330 and, based on the determined context, the virtual lounge services manager 330 can dynamically create a virtual lounge to pertain to the determined context and host participant actions (e.g., communication of messages, avatar actions, and so on). Further, the virtual lounge services manager 330 can automatically invite to participate in the dynamically created virtual lounge one or more of the participants sending and/or receiving the message(s). If a virtual lounge session directed to the determined context of the message(s) is already currently active, the virtual lounge services manager 330 can automatically invite to participate in the dynamically created virtual lounge one or more of the participants of the virtual world sending and/or receiving the message(s).

As noted, those who are already participating in the virtual lounge also can generate virtual lounge requests to invite other users or participants in the virtual world to participate in the virtual lounge. Moreover, participants in the virtual world who are not participating in the virtual lounge also may generate such virtual lounge requests. For example, a participant in the virtual world who is contemplating participation in the virtual lounge, or believes that the virtual lounge may be of interest to other virtual world participants, can generate one or more virtual lounge requests.

In one arrangement, the virtual lounge services manager 330 can dynamically create new virtual lounge sessions directed to a determined message context. By way of example, when the context of messages communicated among virtual world participants is determined, the virtual lounge services manager 330 can determine whether to invite the virtual world participants into an existing virtual lounge, or whether to dynamically create a new virtual lounge session into which to invite the virtual world participants. This determination can be based on any of a myriad of parameters or circumstances, such as user profile information of the virtual world participants, user groups to which the virtual world participants belong or are otherwise associated, geographic locations of the virtual world participants in the real-world and/or the virtual world, and so on.

In yet another aspect of the inventive arrangements, the contextual terms identified by the virtual mail service 332 can be processed by the virtual lounge services manager 330 and/or the common services manager 352 to identify services within the virtual services guide 334 that are likely to be of interest to the participants in the virtual lounge session, and one or more listings of such services can be automatically presented to the participants in the virtual lounge. For example, if the context of the messages communicated in the virtual lounge is identified as "restaurant," the virtual lounge services manager 330 can automatically present a restaurant guide to the participants in the virtual lounge. Similarly, if the context is identified as "movie," the virtual lounge services manager 330 can automatically present to the participants in the virtual lounge a listing of movie theaters, movies presently showing at the movie theaters, and the movie show times.

In a further arrangement, the listing of services can be presented to one or more participants in the virtual lounge in response to a participant request. For example, a plurality of icons can be presented in the virtual lounge to represent different types of service listings that are available, and a participant can select an icon to initiate presentation of the corresponding services that are available. For instance, an icon of a restaurant guide can be selected to initiate presentation of restaurant listings, a theater guide can be selected to initiate presentation of a theater listing, an automobile guide can be selected to initiate presentation of automobile listings, and so on.

The services that are presented can be based, at least in part, on the user profile information that is processed to select the services. For example, the services that are presented can be those that are geographically proximate to the locations of the respective participants. If participants are located in different cities, the services presented to the participants may be different. Nonetheless, the participants who are proximately located with respect to one another can be presented with a listing of the same services. The services that are presented also may be based on user preferences, past user selections and/or user purchases, and so on. Moreover, the listing of the services can be selectively narrowed by one or more of the participants. For instance, the restaurants can be categorized by the type of food served and/or location, and participants can select one or more of these categories to narrow the list. The service listings can provide the names of available services, telephone numbers, hyperlinks to websites, etc.

The virtual lounge services manager 330 also may interface with the advertisement server 336 to identify one or more advertisements related to the identified context and likely to be of interest to the participants in the virtual lounge based on the user profiles. The advertisements then can be presented to the participants in the virtual lounge.

For example, if the context of the messages communicated in the virtual lounge pertains to restaurants, the virtual lounge services manager 330 can automatically present advertisements to the participants from one or more restaurants. Similarly, if the context of the messages communicated in the virtual lounge pertains to movies, the virtual lounge services manager 330 can present advertisements to the participants for one or more movies. For example, one or more movie trailers can be presented to the participants. In one arrangement, the movie trailers can be presented within the virtual lounge, for example on a screen of a virtual television or virtual movie screen contained within the virtual lounge.

A virtual transaction service 338 also can be provided in the system 200. The virtual transaction service 338 can interface with service providers that provide services available to the participants in the virtual lounge in order to facilitate purchase transactions. For example, the virtual transaction service 338 can provide hyperlinks within the virtual lounge to service provider websites and/or integrate purchase information into the virtual lounge. For instance, the virtual transaction service can enable participants in the virtual lounge to purchase movie tickets, order food from restaurants, schedule automotive services, etc. from within the virtual lounge.

The system 200 also can include emergency lounge services 340 which enable participants in the virtual lounge to contact emergency services from within the virtual lounge. For example, the emergency lounge services 340 can provide within the virtual lounge links to emergency response services, such as 911 call centers 342, fire departments 344, police departments 346 and hospitals 348. In one example, an avatar of a participant can be selected, and an emergency service icon can be selected. The emergency lounge service 340 can interface with the virtual lounge services manager 330 and/or the common services manager 352 to identify a location of the participant represented by the selected avatar, and determine the appropriate emergency response centers 342-348 for servicing that participant. Moreover, icons can be presented representing the various emergency response centers 342-348 that, when selected by a participant, automatically contact (e.g. place a call) to the corresponding emergency response centers 342-348 from within the virtual lounge. The emergency lounge service 340 can determine the appropriate emergency response centers 342-348 for the participant's geographic location by accessing a suitable database.

As an example, if a first participant in the virtual lounge indicates to other participants that he is having chest pains, the avatar for the first participant can be selected, and the emergency service icon can be selected. Icons representing the various emergency response centers 342-348 that cover the first participant's geographic location then can be automatically presented. A participant then can select the icon corresponding to the appropriate 911 call center 342 in order to place a call to the 911 call center 342.

Optionally, a mobile services manager 350 and/or a common services manager 352 can be provided. The mobile services manager 350 can manage mobile communication services for user devices that are mobile communication devices. The common services manager 352 can manage services which are commonly provided for users, regardless of whether the users are currently participating in a virtual lounge. For example, the common services manager 352 can manage the presentation of advertisements to users, interface with service providers, etc.

FIG. 4 is a first flowchart presenting a method 400 of sharing context-specific information generated in a virtual lounge. At step 402, one or more messages communicated among at least a first participant in a virtual world and a second participant in the virtual world can be analyzed to determine a context of the message(s). At step 404, based on the determined context of the message(s), the virtual lounge can be dynamically created to pertain to the determined context and host participant interactions.

At step 406, one or more links to emergency response services can be provided within the virtual lounge. The links can be selectable by participants of the virtual lounge to contact the emergency response services from within the virtual lounge.

At step 408, the first participant in the virtual world and/or the second participant in the virtual world can be automatically invited to participate in the virtual lounge. At step 410, based on the determined context to which the virtual lounge pertains, an invitation can be automatically communicated to one or more other participants in the virtual world. The invitation can invite the participant(s) in the virtual world to participate in the context-specific virtual lounge.

At step 412, data representing real-world information can be received. Further, the virtual lounge can be dynamically adapted to reflect the received data. At step 414, present circumstances of the virtual lounge can be monitored. For example, messages communicated in the virtual lounge, activities that take place in the virtual lounge, and/or actions that take place in the virtual lounge can be monitored, as noted. At step 416, the determined context to which the virtual lounge pertains can be updated to correspond to the present circumstances.

At step 418, messages exchanged in other virtual lounges and/or the virtual world can be monitored. Referring to decision box 420, if one or more other messages exchanged in another virtual lounge relate to the determined context of the virtual lounge, at step 422 the other virtual lounge can be automatically merged with the present virtual lounge. For example, the other virtual lounge can be merged into the present virtual lounge, the present virtual lounge can be merged into the other virtual lounge, or the present virtual lounge and the other virtual lounge can be merged into a new virtual lounge.

The process can return to step 410 and continue until the virtual lounge is closed. The virtual lounge can be closed after a defined period has expired, when a number of participants falls below a threshold number, or closed as desired in response to any other circumstance.

FIGS. 5, 6, 7, 8 and 9 are flowcharts presenting additional methods 500, 600, 700, 800, 900 respectively, which also are useful for understanding the present invention. The methods 500-900 can be implemented following step 410 of FIG. 4, though this need not be the case.

Figure 5:
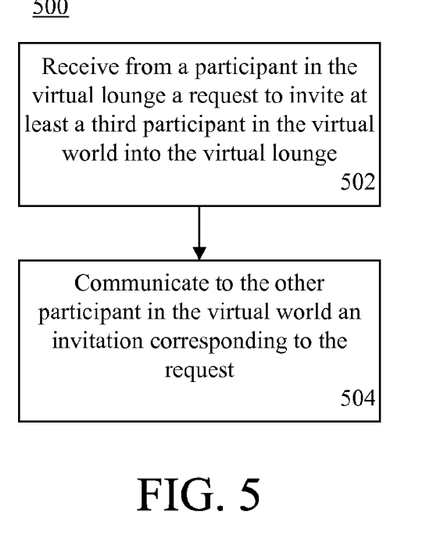
FIGS. 5-9 are additional flowcharts that are useful for understanding the present invention.

Referring to the method 500 of FIG. 5, at step 502 a request can be received from a participant in the virtual lounge to invite at least a third participant in the virtual world into the virtual lounge. At step 504, an invitation corresponding to the request can be communicated to the other participant in the virtual world. The process then can return to step 410 of FIG. 4.

Figure 6:
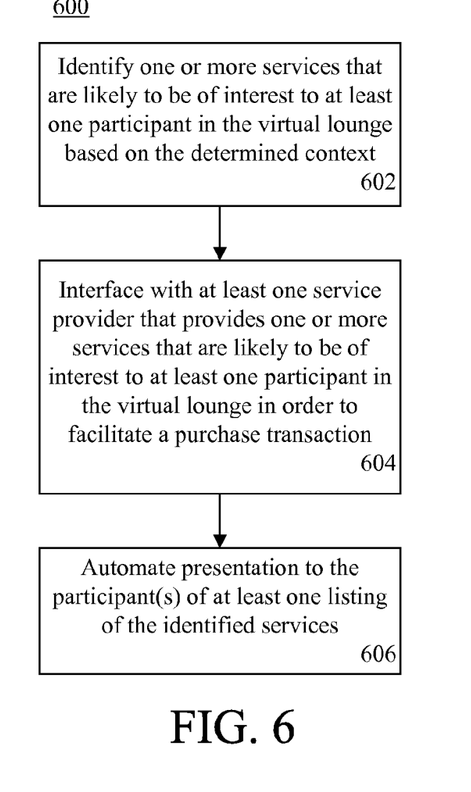

Referring to the method 600 of FIG. 6, at step 602 one or more services that are likely to be of interest to at least one participant in the virtual lounge can be identified. The identification of the services can be based on the determined context to which the virtual lounge pertains. Moreover, profile information of at least one participant in the virtual lounge can be processed to identify the services. At step 604, an interface can be established with at least one service provider that provides one or more services that are likely to be of interest to at least one participant in the virtual lounge in order to facilitate a purchase transaction.

Proceeding to step 606, presentation to the participant(s) of at least one listing of the identified services can be automated. For example, the virtual lounge services manager can communicate with one or more user devices to initiate such presentation. In one arrangement, the listing of identified services can be presented as a plurality of icons. Each icon can represent a different type of service listing that is available and can be configured to be selectable by participants of the virtual lounge to initiate presentation of a corresponding service listing. The process then can return to step 410 of FIG. 4.

Figure 7:
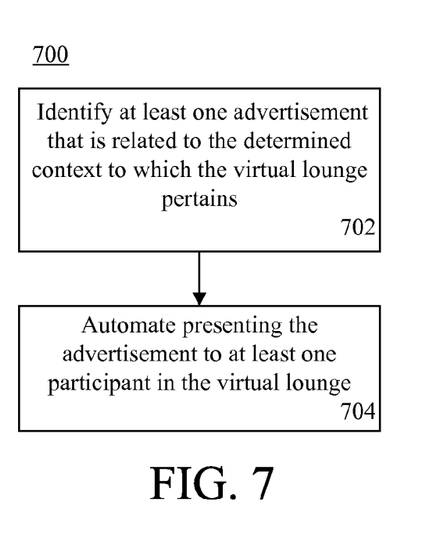

Referring to the method 700 of FIG. 7, at step 702 at least one advertisement can be identified that is related to the determined context to which the virtual lounge pertains. At step 704, presentation to the participant(s) of the advertisement can be automated, for example as previously described. The process then can return to step 410 of FIG. 4.

Figure 8:
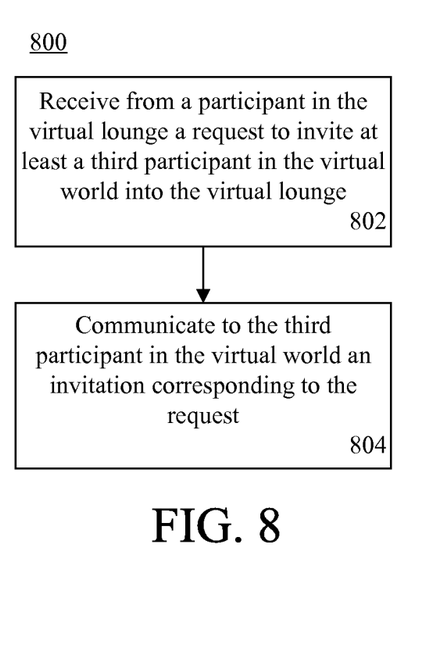

Referring to the method 800 of FIG. 8, at step 802 a request can be received from a virtual lounge participant to invite another participant in the virtual world into the virtual lounge. At step 804 an invitation corresponding to the request can be communicated to the third participant in the virtual world. The process then can return to step 410 of FIG. 4.

Figure 9:
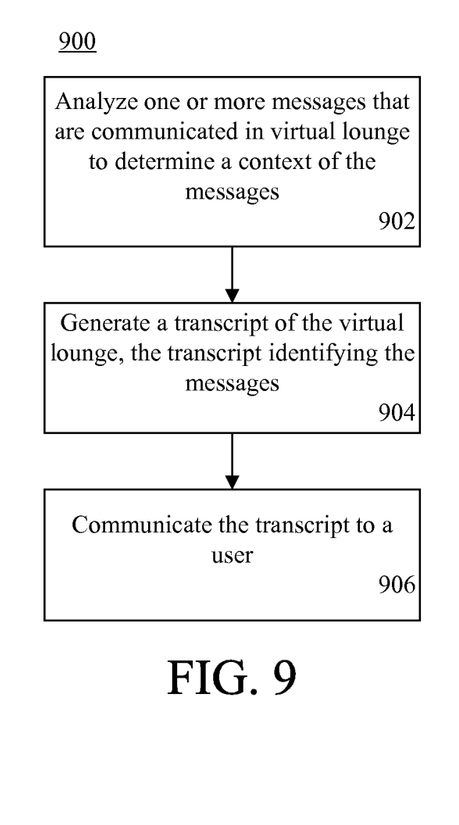

Referring to the method 900 of FIG. 9, at step 902 one or more messages that are communicated in a virtual lounge can be analyzed to determine a context of the messages. At step 904, a transcript of the virtual lounge can be generated that identifies the messages. In one arrangement, the transcript need only identify messages pertaining to a particular context (e.g., the context to which the virtual lounge pertains). In anther arrangement, the transcript can identify messages communicated within a particular period. The messages identified by the transcript also can be selected in any other suitable manner.

Further, the transcript can identify a set of actions performed by at least one avatar within the virtual lounge, and can enable the action to be presented in a video format. In this regard, the transcript can be configured to be processed by a user device to present messages and the identified set of actions.

At step 906, the transcript can be communicated to a user. In one arrangement, the user to which the transcript is communicated can be a user identified by a participant in the virtual lounge. Still, the user to whom the transcript is communicated can be selected in any other desired manner and the invention is not limited in this regard. The process then can return to step 410 of FIG. 4.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The present invention also can be embedded in a computer-usable medium, such as a computer program product or other data programs storage device, readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "software agent," "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

As used herein, the term "real time" means a level of processing responsiveness that a user or system senses as sufficiently immediate for a particular process or determination to be made, or that enables the processor to keep up with some external process.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

This invention can be embodied in other forms without departing from the spirit or essential attributes thereof. Accordingly, reference should be made to the following claims, rather than to the foregoing specification, as indicating the scope of the invention.

What is claimed is:

1. A method of providing a shared virtual lounge experience, comprising:
    analyzing, by a server, at least a first message communicated from a first participant in a first virtual world to a second participant in the first virtual world to determine at least one context of the first message;
    based on the determined context of the first message, dynamically creating, by the server, a new second context-specific virtual lounge that is distinct from the first virtual lounge to pertain to the determined context and host participant interactions; and
    automatically inviting, by the server, to participate in the context-specific virtual lounge at least the first participant selected from a group consisting of the first participant in the virtual world and the second participant of the virtual world to interact with the second participant.

2. The method of claim 1, further comprising:
    receiving from a participant in the second context-specific virtual lounge a request to invite at least a third participant in the first virtual world into the second context-specific virtual lounge; and
    communicating to the third participant in the first virtual world an invitation corresponding to the request.

3. The method of claim 1, further comprising:
    based on the determined context to which the second context-specific virtual lounge pertains, automatically communicating an invitation to a third participant in the first virtual world, the invitation inviting the third participant in the first virtual world to participate in the second context-specific virtual lounge.

4. The method of claim 1, further comprising:
    monitoring present circumstances of the second context-specific virtual lounge;
    analyzing the present circumstances of the second context-specific virtual lounge to identify a context of the present circumstances; and
    dynamically updating the determined context to which the second context-specific virtual lounge pertains to include the determined context of the present circumstances.

5. The method of claim 1, further comprising:
    determining whether at least a second message exchanged in a third virtual lounge relates to the determined context to which the second context-specific virtual lounge pertains; and
    automatically merging the third virtual lounge into the second context-specific virtual lounge.

6. The method of claim 1, further comprising:
    determining whether at least a second message exchanged in a third virtual lounge relates to the determined context to which the second context-specific virtual lounge pertains; and
    automatically merging the second context-specific virtual lounge into the third virtual lounge.

7. The method of claim 1, wherein analyzing the first message communicated from the first participant in the first virtual world to the second participant in the first virtual world to determine a context of the message comprises:
identifying at least one contextual term in the first message.

8. The method of claim 1, wherein analyzing the first message communicated from the first participant in the first virtual world to the second participant in the first virtual world to determine a context of the message comprises:
identifying at least one contextual term that occurs at a number of instances equal to or greater than a threshold value in a plurality of messages communicated by the first participant in the first virtual world or the second participant in the first virtual world.

9. The method of claim 1, further comprising:
identifying at least one service that is likely to be of interest to at least one participant in the second context-specific virtual lounge based on the determined context to which the second context-specific virtual lounge pertains; and
automating presentation to the participant of the at least one listing of the at least one service.

10. The method of claim 9, wherein identifying the at least one service that is likely to be of interest to the at least one participant in the second context-specific virtual lounge based on the determined context comprises:
processing profile information of the at least one participant in the second context-specific virtual lounge.

11. The method of claim 9, wherein automating presentation to the participant of the listing of the at least one identified service comprises:
presenting a plurality of icons in the second context-specific virtual lounge, each icon representing a different type of service listing that is available and being selectable by participants of the second context-specific virtual lounge to initiate presentation of a corresponding service listing.

12. The method of claim 9, further comprising:
interfacing with at least one service provider that provides at least one service that is likely to be of interest to the at least one participant in the second context-specific virtual lounge in order to facilitate a purchase transaction.

13. The method of claim 1, further comprising:
identifying at least one advertisement that is related to determined context to which the second context-specific virtual lounge pertains; and
automating presentation of the at least one advertisement to at least one participant in the second context-specific virtual lounge.

14. The method of claim 13, wherein identifying the advertisement that is related to the determined context to which the second context-specific virtual lounge pertains comprises:
identifying at least one advertisement likely to be of interest to the participant based on a user profile of the participant.

15. The method of claim 1, further comprising:
providing within the second context-specific virtual lounge at least one link to an emergency response service, the at least one link being selectable by participants of the second context-specific virtual lounge to contact the emergency response service from within the second context-specific virtual lounge.

16. The method of claim 1, further comprising:
analyzing at least a second message that is communicated in the second context-specific virtual lounge to determine a context of the second message;
generating a transcript of the second context-specific virtual lounge, the transcript identifying at least the second message; and
communicating the transcript to a user.

17. The method of claim 16, wherein generating the transcript of the second context-specific virtual lounge comprises:
generating a transcript that further identifies a set of actions performed by at least one avatar within the second context-specific virtual lounge, the transcript enabling the actions to be presented in a video format.

18. The method of claim 17, wherein generating the transcript that further identifies the set of actions performed by the at least one avatar within the second context-specific virtual lounge comprises:
generating a transcript that is configured to be processed by a user device to present at least the second message and the identified set of actions.

19. The method of claim 1, further comprising:
receiving data representing real-world information; and
dynamically adapting the second context-specific virtual lounge to reflect the received data.

20. A non-transitory computer program product comprising:
a computer-usable medium comprising computer-usable program code that provides a shared virtual lounge experience, the computer-usable medium comprising:
computer-usable program code that analyzes at least a first message communicated from a first participant in a first virtual world to a second participant in the first virtual world to determine at least one context of the first message;
computer-usable program code that, based on the determined context of the first message, dynamically creates a new second context-specific virtual lounge that is distinct from the first virtual lounge to pertain to the determined context and host participant interactions; and
computer-usable program code that automatically invites to participate in the second context-specific virtual lounge at least the first participant selected from a group consisting of the first participant in the first virtual world and the second participant of the first virtual world to interact with the second participant.

* * * * *